United States Patent

Hart

[11] 3,909,702
[45] Sept. 30, 1975

[54] SWITCHING VOLTAGE REGULATOR WITH OPTICAL COUPLING

[75] Inventor: Burt E. Hart, Red Hook, N.Y.

[73] Assignee: IBM Corporation, Armonk, N.Y.

[22] Filed: Dec. 26, 1973

[21] Appl. No.: 427,772

[52] U.S. Cl. .................. 323/17; 321/2; 321/19; 323/20; 323/21; 323/22 T; 323/DIG. 1
[51] Int. Cl.² .............................................. H02M 3/335
[58] Field of Search ............ 321/2, 18, 19; 323/17, 323/20, 21, 22 T, DIG. 1

[56] References Cited
UNITED STATES PATENTS

| | | | |
|---|---|---|---|
| 3,414,798 | 12/1968 | Nielsen | 321/2 |
| 3,478,256 | 11/1969 | Tomota | 321/2 |
| 3,591,830 | 7/1971 | Woolsey | 323/DIG. 1 |
| 3,701,937 | 10/1972 | Combs | 321/2 |
| 3,702,434 | 11/1972 | Ryan | 323/20 |
| 3,737,756 | 6/1973 | Hasley et al. | 321/2 |
| 3,746,892 | 7/1973 | Ogiso et al. | 323/21 UX |
| 3,789,289 | 1/1974 | Bell et al. | 321/2 |
| 3,806,791 | 4/1974 | Johnson | 323/DIG. 1 |
| 3,818,306 | 6/1974 | Marini | 323/DIG. 1 |

*Primary Examiner*—A. D. Pellinen
*Attorney, Agent, or Firm*—William S. Robertson

[57] ABSTRACT

An improved voltage regulator has a transistor connected to switch on and off the current to the load with a variable waveform that establishes the effective current level. A voltage detector circuit adjusts the regulated current level to the level required to maintain the selected load voltage.

2 Claims, 4 Drawing Figures

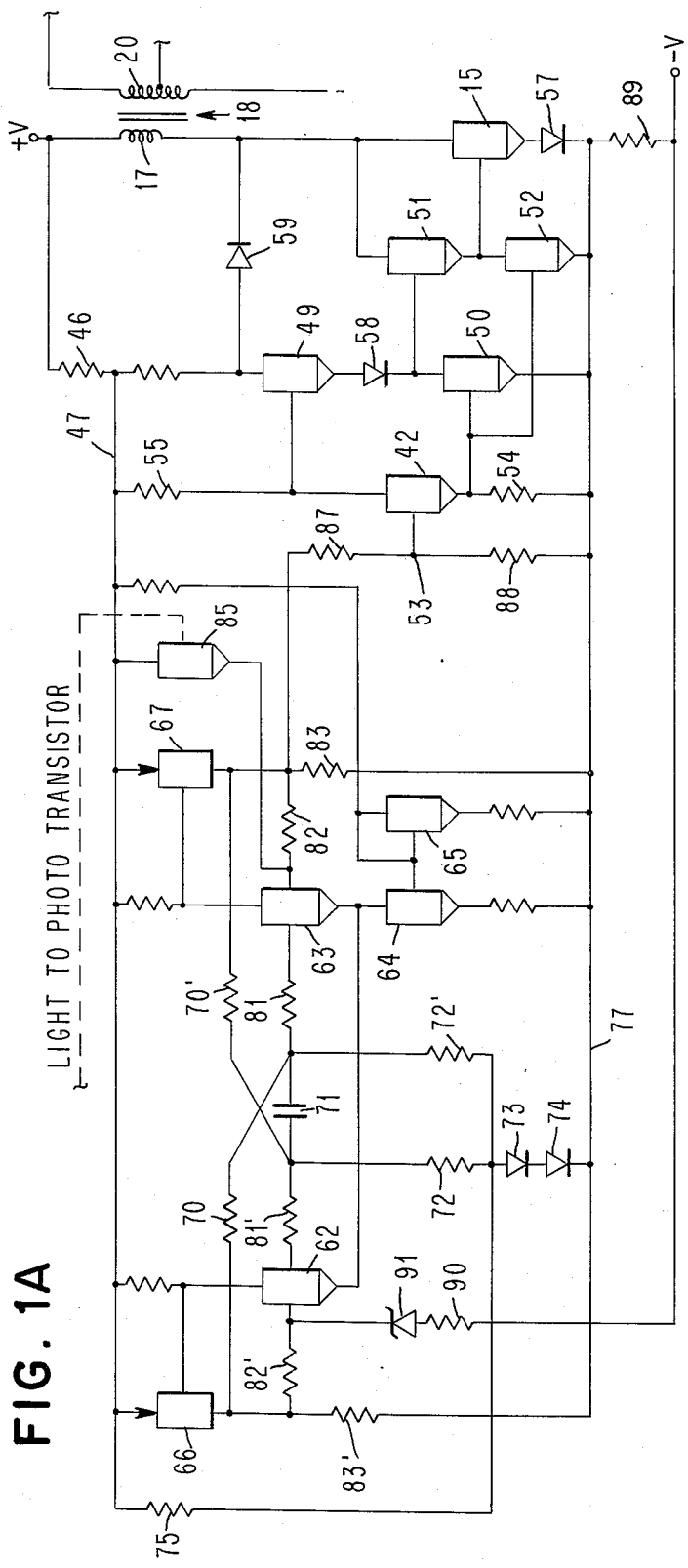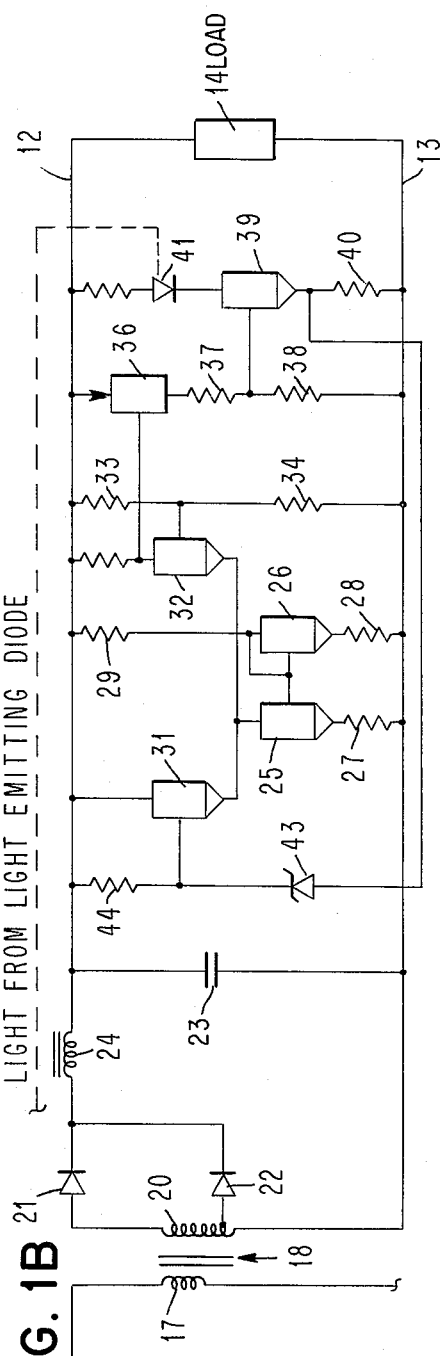
FIG. 1A
FIG. 1B

SWITCHING VOLTAGE REGULATOR WITH OPTICAL COUPLING

SUMMARY OF THE INVENTION

Some voltage regulators include transistors that are turned on and off to provide a load with a direct voltage that is less than the voltage applied to the transistor according to the portion of the switching cycle during which the transistor is turned on. The load voltage is detected and the switching cycle is varied to establish a selected load voltage. These circuits may also include an inductor that receives power from the transistor switch and a diode that connects the inductor to supply power to the load when the transistor is turned off. The circuits may have a transformer for coupling the switching transistor to the load, and to preserve the electrical isolation that the transformer provides; the voltage sensed at the load may be transmitted to the circuits that control the transistor by means of an optical coupler. In such an optical coupler, a light emitting diode converts an electrical signal to a light signal and a photo transistor reconverts the light signal to an electrical signal. This invention relates to improved voltage regulators of this general type.

The regulator of this invention has a circuit that provides a current that is set to a regulated value. The regulated current is supplied to a circuit that converts it to an alternating polarity to be transmitted through a transformer. At the secondary winding of the transformer, the current is rectified and supplied to a load. The load voltage is sensed and an error signal is transmitted as a light signal. In response to the light signal, circuits adjust the current level that is to be maintained by the switched transistor. The voltage regulator has particularly improved stability.

Other regulators are disclosed that use components of this regulator. From the following description of the voltage regulators of the drawing, other features and objects of the invention will be apparent.

THE DRAWING

FIGS. 1A and 1B are schematic drawings of one voltage regulator circuit of this invention.

THE VOLTAGE REGULATOR OF THE DRAWING

Introduction

Figure 2:
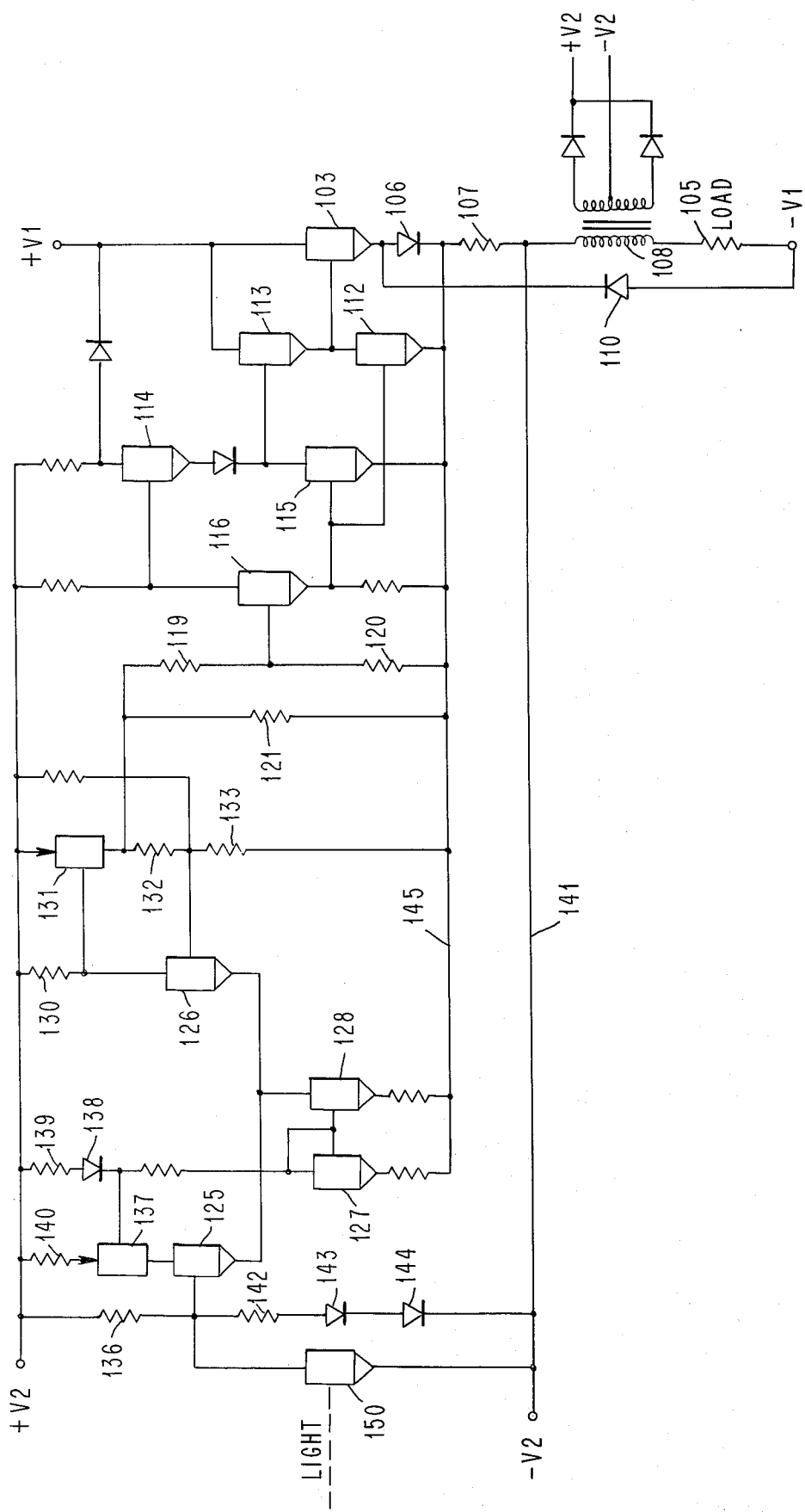
FIG. 2 is a schematic drawing of a second voltage regulator of this invention.

The circuit of FIGS. 1A and 1B receive a direct voltage at terminals +V and −V and produces a regulated direct voltage across terminals 12 and 13 of a load 14. The components of FIG. 1A include a transistor 15 that is connected with the power supply terminals for applying current pulses in the primary winding 17 of a transformer 18 as transistor 15 is turned on and off by other components of FIG. 1A. Transformer 18 appears in both FIG. 1A and FIG. 1B. In FIG. 1B, the voltage across secondary winding 20 of transformer 18 is rectified, filtered and applied to load 14. Components of FIG. 1B sense the voltage at load 14.

The Circuit of FIG. 1B

Diode 21 is connected with secondary winding 20 to form a halfwave rectifier, diode 22 helps to reset the core of transformer 18. Capacitor 23 and inductor 24 form a filter that is proportional to the load voltage. Transistors 25, 26 and resistors 27, 28 and 29 form a current source at the collector terminal of transistor 25; this current source is applied at the common connection point of the emitter terminals of transistors 31 and 32 and these components form a differential amplifier. Resistors 33 and 34 are connected to apply a measure of the load voltage to the base terminal of transistor 32. A reference voltage, described later, is applied to the base terminal of transistor 31. Thus, as the load voltage falls with respect to the reference, transistor 32 turns off and its collector terminal goes more positive. A transistor 36 and resistors 37 and 38 are connected to amplify the voltage at the collector terminal of transistor 32. A transistor 39 and a resistor 40 are connected to form a current source for energizing a light emitting diode 41 according to the voltage level at the common connection point of resistors 37 and 38. Thus, the current and the light intensity of light emitting diode 41 varies with the load voltage.

Resistor 40 is a component of a network, introduced earlier, that establishes a reference voltage at the base terminal of transistor 31 of the differential amplifier. A zener diode 43 conducts with a resistor 44 to establish a fixed voltage between the base terminal of transistor 31 and a common connection point of resistor 40 and the emitter terminal of transistor 39. Thus, this connection provides negative feedback to the differential amplifier.

The Circuit of FIG. 1A

A resistor 46 is connected to produce at a point 47, a switchable voltage for operating components of the circuit of FIG. 1A. Transistors 42–52 and other components cooperate to switch transistor 15 on and off in opposite phase to the voltage at a point 53. Transistor 42 is connected with resistors 54, 55 to produce a voltage in phase with the voltage of point 53 at its emitter terminal and an out of phase voltage at its collector terminal. Transistor 49 responds to the out of phase voltage to turn on transistors 51 and 15. Transistors 50 and 52 respond to the in phase voltage to turn off transistor 51 and transistor 15 respectively. Diode 57 provides a voltage that helps to turn off transistor 15 when transistor 52 turns off. Diodes 58 and 59 prevent transistor 15 from becoming saturated. Since there are more voltage drops from the collector terminal of transistor 49 to the base terminal of transistor 15 than from the collector terminal of transistor 49 to the collector terminal of transistor 15, the collector terminal of transistor 15 can not become more negative than the base terminal of transistor 15. The voltage at point 53 which switches transistor 15 is provided by an oscillator that will be described next.

Transistors 62 and 63 are connected to differentially conduct the current established by transistors 64 and 65, as can be understood from the description of transistors 25, 26, 31 and 32 in FIG. 1B. The voltage at the collector terminal of transistor 63 is amplified by a transistor 67. The collector terminal of transistor 66 is connected to the base terminal of transistor 62 and the collector terminal of transistor 67 is connected to the base terminal of transistor 63 to provide positive feedback.

A capacitor 71 and a network of resistors interconnect transistors 62 and 63 to form an astable circuit. An example of the operation will explain the connections of these components.

Suppose that transistors 62 and 66 have just been turned on (by an operation that will be described). Transistor 66 supplies current in the circuit of a resistor 70, a capacitor 71, a resistor 72, and a point of potential that is established by the connection of diodes 73, 74 and a resistor 75 between line 47 and a line 77. (A resistor described later, connects line 77 to the negative potential point of the associated power supply.) Conduction in this circuit path produces a voltage across resistor 72 that tends to turn on transistor 62. Transistor 66 also conducts in a circuit with resistor 70 and resistors 81, 82 and 83. The voltage across resistors 82 and 83 in this circuit tend to turn on transistor 63. Thus, conduction by transistor 66 establishes circuits for turning on both transistors 62, 63 of the differential amplifier. (The connection of the collector terminal of transistor 66 to the base terminal of transistor 62 also helps to turn on transistor 66.) However, the connection with capacitor 71 establishes a time limit to the operation of turning on transistor 62; as capacitor 71 charges, the voltage across resistor 72 decreases until the potential at the base terminal of transistor 62 falls below the base terminal of transistor 63 and transistor 63 turns on and, by the current switching operation at the emitter terminals of transistors 62 and 63, transistor 62 turns off. Additionally, it can be seen that the capacitor charges in alternating polarities as transistors 62 and 63 switch so that when transistors 62 and 66 turn on, the capacitor charge adds to the voltage across resistor 72. Components that are counterparts of the components just described, operate similarly when transistor 63 turns on, and these counterpart components have the reference number of the preceding description with a distinguishing prime. It can be seen that the values of capacitor 71 and resistors 70, 70' can be selected to establish a frequency that is desired for switching transistor 15.

Operation — FIGS. 1A and 1B

As the circuit has been described so far, transistors 62 and 63 would switch symetrically at the selected frequency. Signals are applied to the circuit to vary the symmetry of the switching operation for regulating the voltage across load 14. A photo transistor 85 is connected to increase the average voltage level at the base terminal of transistor 63 so that transistor 63 is turned on for a greater portion of the cycle when photo transistor 85 is more highly illuminated. Photo transistor 85 is arranged to be illuminated by light emitting diode 41 of FIG. 1B. Thus, as the load voltage falls, the light emitting diode produces less light, transistor 85 conducts less and transistors 63 and 67 conduct during a shorter portion of the cycle. Conversely, when the voltage of load 14 rises, transistors 63 and 67 are controlled to conduct during a larger portion of the cycle. Resistors 87 and 88 connect the collector terminal of transistor 67 to establish the signal at point 53 which has already been introduced. Since transistor 15 is switched in opposite phase to this signal, its on time is increased when the load voltage falls and decreased when the load voltage rises to provide a regulated load voltage.

A resistor 89 is connected in the emitter circuit of transistor 15 to provide a voltage that is proportional to the load current. A resistor 90 and a zener diode 91 connect the negative terminal of resistor 89 to the base terminal of transistor 62 so as to lower the voltage at the base terminal of transistor 62 and end the conduction of transistor 62 and transistor 15 at the selected current value.

The Circuit of FIG. 2

In the circuit of FIG. 2, a transistor 103 is switched on and off rapidly to provide a selected current for a load 105. Transistor 103 conducts between terminals +V1 and −V1 in circuit with a diode 106, a resistor 107 and inductor winding 108 and the load. As will be explained later, resistor 107 and inductor 108 provide signals that are used for controlling the switching of transistor 103. A diode 110 is connected to conduct in circuit with the load and with diode 106, resistor 107 and inductor 108 when transistor 103 is turned off and the load receives its energy from inductor 108.

Transistors 112, 113, 114, 115 and 116 and the associated diodes and resistors are connected in the configuration of FIG. 1A that has already been described. These components amplify and invert the signal that appears at the base terminal of transistor 116, and the general operation of the circuit of FIG. 2 can be understood readily by the recalling that transistor 103 responds in opposite phase to the signal produced at the network of resistor 119, 120 and 121 that are connected to the base terminal of transistor 116.

Transistors 125, 126, 127 and 128 form a differential amplifier, as can be understood from the corresponding components of FIGS. 1A and 1B. A resistor 130 couples the collector voltage of transistor 126 to the base terminal of a transistor 131, and resistors 132 and 133 in the collector circuit of transistor 131 provides a voltage at the base terminal of transistor 126. Thus, when the differential amplifier is operated to turn off transistor 126, transistor 131 is also turned off and the resistor network associated with the base terminal of transistor 126 and the circuit voltages establish a reference voltage at the base terminal of transistor 126. When transistor 126 is turned on, transistor 131 supplies additional current in resistors 132 and 133 and thereby raises the potential at the base terminal of transistor 126 to further turn on transistor 126. Thus, transistor 131 and the associated resistors establish a reference voltage at which transistor 126 turns on and they provide positive feedback for turning on transistor 126. In addition, the collector terminal of transistor 126 provides the signal to the base terminal of transistor 116 which switches transistor 103 in opposite phase relationship to transistors 126 and 131.

A resistor 136 connects the base terminal of transistor 125 to potential point +V2 for turning on transistor 125. A transistor 137 is connected to supply current to the collector terminal of transistor 125. A diode 138 and resistor 139 establish a reference voltage at the base terminal of transistor 137 and a resistor 140 in the emitter circuit of transistor 137 cooperates with these components to form the current source. This current source limits the response of the conventional components of the differential amplifier to a signal at the base terminal of transistor 125.

A line 141 and a resistor 142 and two diodes 143, 144 (which introduce voltage drops) connect the voltage across resistor 107 to appear between the base terminal of transistor 125 and the common terminal 145 of the differential amplifier. In the absence of the current through resistor 107, the potential at the base terminal of transistor 125 rises above the potential of the base terminal of transistor 126 and thereby turns on transistor 125. This operation turns on transistor 103 and produces a voltage drop across resistor 107 that rises with the current in inductor winding 108. The switching of transistor 103 is arranged so that the load is supplied continuously with power, alternately from the power supply and from the inductor. The resistor 107 has an alternating and current voltage component that rises when transistor 103 turns on and falls when transistor 103 is off. This component alternates about the value at which transistor 125 turns on and off. (The components are appropriately shielded to prevent capacitively coupling these voltages to other components.)

A photosensitive transistor 150 is connected to conduct at the base terminal of transistor 125 to control the potential at which transistors 125 and 126 switch. The network of FIG. 1B is connected for sensing the average voltage of load 105 and vary the switching of the circuit to regulate the current. This circuit is a component of the circuit of FIG. 3.

Figure 3:
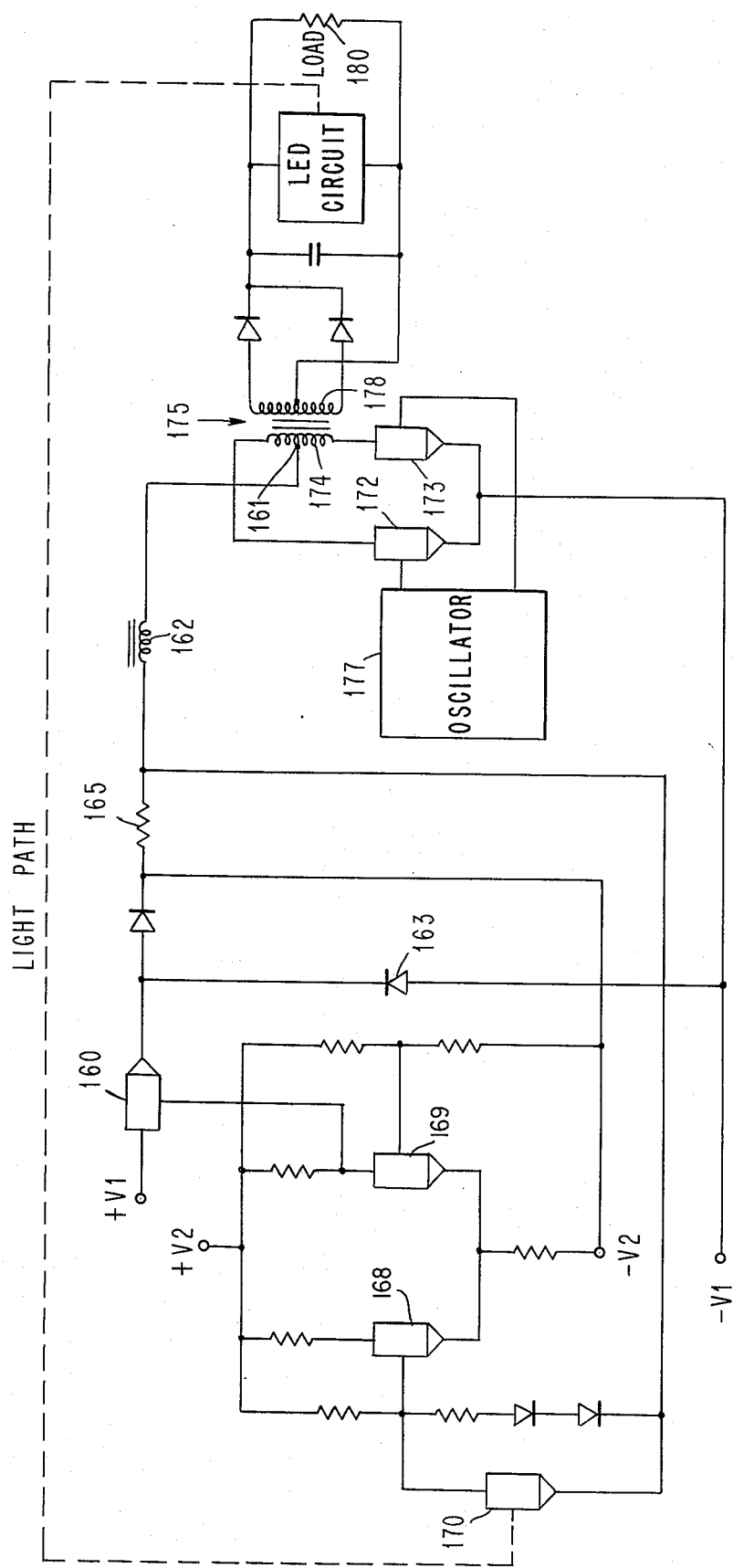
FIG. 3 is a schematic drawing of a third voltage regulator of this invention.

The Circuit of FIG. 3

In the circuit of FIG. 3, a transistor 160 is switched to provide a regulated current at a node 161. An inductor 162 and a diode 163 cooperate to provide current to node 161 when transistor 160 is turned off; these components correspond to inductor 108 and diode 110 in FIG. 2. A resistor 165 provides a signal that is proportional to the current at node 161. A differential amplifier is connected to switch transistor 160 in response to the load current signal as shown in the circuit of FIG. 2. (This circuit is shown in a more general form as two transistors 168 and 169 and associated components.) A photo transistor 170 controls the differential amplifier to decrease the conduction of transistor 160 when the illumination of transistor 170 is increased.

Two transistors 172, 173 connect opposite halves of a primary winding 174 of a transformer 175 to conduct the current at node 161. The transistors are connected to be switched oppositely by an oscillator 177. The circuit configuration of transistors 172, 173 is conventional and various switchable oscillator circuits are well known. Advantageously, the circuit may use the oscillator of FIG. 1A. The secondary winding 178 is connected to provide a direct voltage to a load 180. The light emitting diode circuit of FIG. 1B is connected to sense the load voltage and to illuminate photo transistor 170.

Thus, transistor 160 is controlled to provide current regulation at node 161. This portion of the circuit is highly stable. The light path adjusts the operation of this regulator to provide highly stable regulation of the voltage at load 180.

The circuit of FIG. 3 is particularly stable. Its components are useful in other circuits of this general type. From the detailed description of the preferred circuit and the suggested variations in circuit design, those skilled in the art will recognize suitable adaptations and variations within the spirit of the invention and the scope of the claims.

What is claimed is:

1. A voltage regulator comprising, a transformer having a primary winding and a secondary winding, first and second, transistors connected to switch a current through the primary winding to produce in alternating voltage across the secondary winding, means to turn said two transistors on and off alternately, and means for connecting said secondary winding to supply a voltage to a load, means for comparing said load voltage with a reference and for providing a first signal according to the difference between the load voltage and the reference, a third transistor connected to supply said current to said transformer and a resistor connected to provide a second signal proportional to said current, a differential amplifier having fourth and fifth transistors of a first conductivity type, and means connected to provide a current differentially to the emitter terminals of said fourth and fifth transistors, means connecting said fourth transistor to receive a reference voltage, means connecting said fifth transistor to receive said first signal and said second signal, a sixth transistor of opposite conductivity type connected in the collector circuit of said fifth transistor to limit the current in said third transistor, and means connecting the collector terminal of said fourth transistor to control said third transistor to supply said current to said transformer at a value to maintain said load voltage.

2. The voltage regulator of claim 1 wherein said means for providing said first signal comprises a light emitting diode and means for energizing said light emitting diode according to said difference between said load voltage and said reference, and said means connecting said fifth transistor to receive said first signal comprises a photo transistor arranged to receive the light produced by said light emitting diode and connected to vary the response of said differential amplifier to said second signal according to said light for adjusting the current according to the requirements of the load.

* * * * *